Oct. 15, 1963  P. A. MORGAN  3,107,061
VEHICLE LIGHTING SYSTEM
Filed Oct. 10, 1960
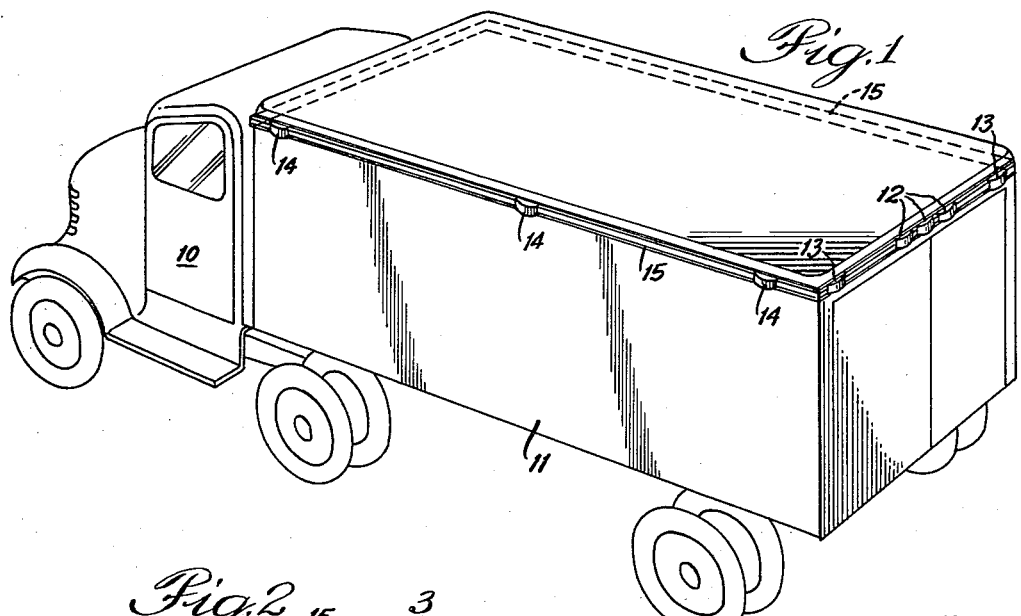
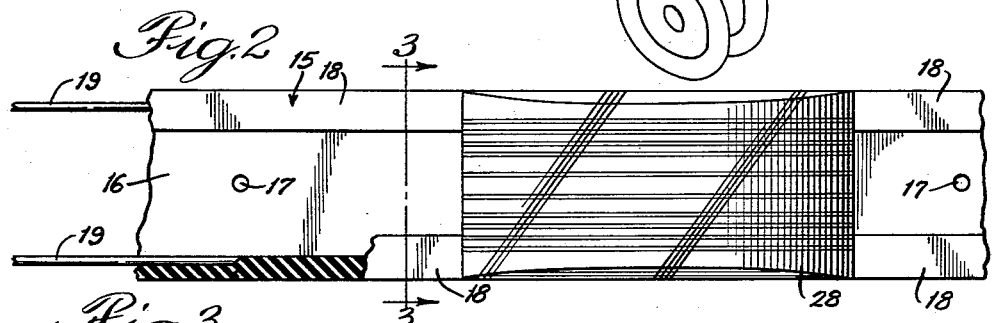
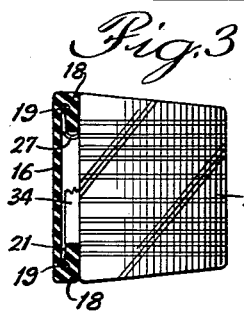
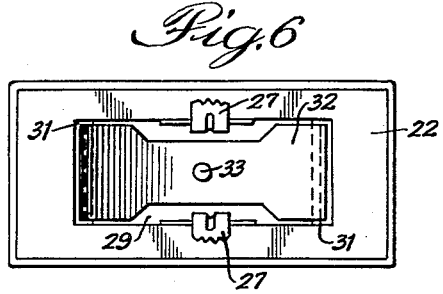
INVENTOR:
Paul A. Morgan,
BY
Bair, Freeman & Molinare
ATTORNEYS.

United States Patent Office 3,107,061
Patented Oct. 15, 1963

3,107,061
VEHICLE LIGHTING SYSTEM
Paul A. Morgan, Chicago, Ill., assignor to King Bee Manufacturing Co., Bellwood, Ill., a corporation of Illinois
Filed Oct. 10, 1960, Ser. No. 61,512
1 Claim. (Cl. 240—8.2)

This invention relates to a vehicle lighting system and more particularly to identification and clearance lights on highway vehicles, such as trucks, semi-trailers, trailers, buses, and the like.

The requirements of the Interstate Commerce Commission for lighting of large sized commercial highway vehicles are very strict and must be strictly observed by the vehicle operator. These requirements require that trucks, semi-trailers, trailers, buses and the like, not only be provided with the usual head and tail lights, stop lights and turn signals, but that they in addition carry identification and clearance lights at specified locations thereon. These lights have heretofore been of more or less conventional construction in which a lamp is carried in a wired socket and is covered by a lens. If the lamps of such lights burn out while the vehicle is on the road, they are difficult and awkward to replace and until they are replaced, the vehicle cannot be operated over the highways. It is therefore highly important that such lights be provided of a character which will permit quick and easy repair by the operator of the vehicle without the necessity for calling in special mechanics and delaying the vehicle.

It is one of the objects of the present invention to provide a vehicle lighting system in which the lights can be quickly and easily mounted on the vehicle and connected in the wiring thereof without the use of any tools.

Another object is to provide a vehicle lighting system in which a conductor strip permanently attached to the vehicle cooperates with a light unit in such a way that the light unit can be installed and connected in the power circuit simply by placing it on the strip and turning it through an angle approximately 90°.

A further object is to provide a light unit for use in a vehicle lighting system which is of a very simple and inexpensive construction so that if the lamp therein burns out the entire unit can be discarded and replaced at a minimum of expense.

Other objects and features of the invention relate to the particular construction of the light unit for simplicity and cheapness of manufacture and for mounting on a conductor strip on the vehicle.

The above and other objects and features of the invention will be more readily apparent from the following description when read in connection with the accompanying drawing, in which:

FIGURE 1 is a perspective view of a semi-trailer highway vehicle equipped with a lighting system embodying the invention;

FIGURE 2 is a face view of a conductor strip embodying the invention with a light unit mounted thereon and with parts of the conductor strip broken away;

FIGURE 3 is a section on the line 3—3 of FIGURE 2;

FIGURE 4 is a top plan view of the conductor strip and light unit of FIGURE 3;

FIGURE 5 is a side view of the light unit itself with portions of the lens cover broken away; and FIGURE 6 is a bottom view of the light unit.

The invention is illustrated in FIGURE 1 as applied to a semi-trailer vehicle, including a tractor unit indicated generally at 10, and a semi-trailer 11 secured to the tractor unit to be hauled thereby. The exact construction of the vehicle forms no part of the present invention, it being understood that the lighting system of the invention can be applied equally well to any type of highway vehicle with the semi-trailer shown being selected only for the purpose of an illustrative example.

In semi-trailer units of the type illustrated in FIGURE 1, it is required that the vehicle be equipped not only with the usual head and tail lights, stop lights and turn signals, not shown in the drawing, but also with various identification and clearance lights at specified locations thereon. In a semi-trailer of the size indicated in FIGURE 1, groups of identification lights, as indicated at 12, must be mounted at the front and rear of the vehicle, clearance lights 13 must be similarly mounted at the front and rear corners of the vehicle and side marker lamps 14 must be mounted at the sides of the vehicle.

According to the present invention, these various lights, as well as other lights with which the vehicle may be equipped, are light units identical in construction, but which may be formed with different colored lenses if desired and all of which may be mounted on different conductor strips 15 permanently secured to the vehicle. As shown in FIGURE 1, the conductor strip 15 extends substantially continuously around the semi-trailer at the upper part thereof and may be connected to the electrical source, such as the battery of the tractor, through any desired type of connector. Similar conductor strips could be mounted at different locations or different levels on the vehicle for mounting of additional lights thereon, if desired.

As shown in FIGURE 2, the conductor strip 15 is a flat tape-like member, preferably formed of plastic insulating material, with a flat web 16 periodically pierced, as shown at 17, to receive screws or similar fastenings for mounting it on the vehicle body. The edges of the web are formed with integral thicker flanges 18 in which conductors 19 are embedded to be held in spaced relationship. The conductor strip could, if preferred, be formed of metal in which case the conductors would be themselves individually insulated from the metal. The flanges 18, as shown, are undercut at their inner sides in the form of slits 21 which extend to or substantially to the conductors so that the prongs on the lighting units, as described more fully hereinafter, may readily make contact with the conductors. It will be apparent that a strip of this character can easily and permanently be attached to the vehicle body in any desired location to support lighting units on the vehicle, as required.

The light unit for cooperation with the conductor strip comprises a flat base 22, preferably molded of plastic material, with a rectangular rim portion at its lower edge and tapering upwardly therefrom, as best seen in FIGURE 5. Metal conductor prongs 23 extend through the base at opposite sides thereof and terminate above the base in spaced lug members 24 to which a lamp 25 may be mounted. As shown, the lamp carries spaced wires 26 which may be clipped or soldered to the lug elements 24 at opposite sides of the base respectively to connect the lamp in circuit with the prongs.

At the bottom of the base, the prongs project outwardly therefrom a distance approximately equal to the space between the upper edges of the flanges 18 and the web 16 and are then turned outwardly in opposite directions, as indicated at 27. The tips of the outwardly turned portions 27 are preferably serrated and are slightly rounded as shown in FIGURE 6 to facilitate free mounting on the conductor strip by turning the light unit in either direction. A translucent lens cover, indicated generally at 28, is secured over the base and encloses the lamp 25. The lens cover, as shown, is preferably arcuate in one plane and generally rectangular in another plane and is cup-shaped with its open edge fitting over the edge of the base and with the major portion thereof projecting from the base. Preferably the lens is permanently cemented to the base. It will be understood that the lens may be made in any desired color and it will be seen that when the lamp 25 is lighted substantially the entire lens will be illuminated so that it is readily visible from any direction.

In mounting the light unit on the conductor strip, the base is placed over the conductor strip with its length transverse thereto so that the prongs 23 and the extensions 27 thereof will lie between the flanges 18 of the conductor strip. With the lamp unit in position, it may be turned through 90° more or less to move the extensions 27 on the conductor strip into the slots 21 and into electrical contacting engagement with the conductors 19. Engagement of the prongs beneath the flange portions of the conductor strip will securely mount the light unit on the conductor strip and with the prongs and the serrated tips thereof engaging the conductors 19 an electrical circuit will be established between the lamp 25 and the conductors 19.

In order to hold the light unit on the conductor strip against accidental removal, the base 22 is defined on its lower surface with an elongated recess 29 perpendicular to a line between the prongs 27. Slots 31 may be formed partially or entirely through the base at the ends of the recess. A leaf spring latch element 32 of a size to fit within the recess is secured therein by means of a screw or rivet fastening 33 centrally of the length thereof and its end portions are bowed outwardly, as best seen at 34 in FIGURE 5, to project beyond the bottom of the base. Preferably the ends of the spring member are turned upwardly, as shown at 35, and fit into the slots 31 to assist in preventing turning of the spring relative to the base.

When the light unit is placed on the conductor strip transversely thereto and is turned to secure it in place, the projecting ends 34 of the spring latch member will be forced inwardly of the base to allow it to slide over the flanges 18. However, when the light unit is turned into alignment with the conductor strip, as shown in FIGURE 2, the end portions of the spring latch member will again spring outwardly to the position of FIGURE 5 and will fit between the flanges 18 of the conductor strip thereby to prevent accidental turning of the light unit. Not only will this construction prevent any accidental removal of the light unit, but will prevent children or others from intentionally removing the unit.

It is intended, according to the present invention, that when a light unit is burned out it must be destroyed in order to remove it from the conductor strip. For this purpose, the lens cover is made relatively fragile so that it can be split open relatively easily by a screw driver or similar tool and the base can then be broken away from the conductor strip. Since the entire unit is very simple and inexpensive, it is contemplated that once a lamp in a unit has been burned out the whole unit will be discarded and a new unit will be substituted therefor. In this connection, it is noted that if any lamp in one unit should burn out while the vehicle is in transit, the operator could simply mount a new unit on the conductor strip closely adjacent to the burned out unit and still operate the vehicle legally on the highway, the burned out unit being removed at leisure.

While one embodiment of the invention has been shown and described herein, it will be understood that it is illustrative only and not to be taken as a definition of the scope of the invention, reference being had for this purpose to the appended claim.

What is claimed is:

A light unit for use with a conductor strip comprising a flat base of insulating material, a pair of spaced conductor prongs extending through the base and having their ends bent in opposite outwardly extending directions parallel to the base at one side thereof for contacting and supporting engagement with the conductor strip, a lamp mounted on the other side of the base and conductively connected to the prongs, a translucent cover fitting over and permanently secured to the base and enclosing the lamp, said one side of the base being formed with an elongated recess perpendicular to a line between the prongs, and an elongated leaf spring positioned in the recess and carried on the base, with the end portions of the spring bowed outwardly from the base to permanently latch the light unit against turning when the unit is mounted on a conductor strip.

References Cited in the file of this patent

UNITED STATES PATENTS

| | | |
|---|---|---|
| 2,170,300 | Frank | Aug. 22, 1939 |
| 2,275,533 | Landy | Mar. 10, 1942 |
| 2,332,766 | Von Gehr | Oct. 26, 1943 |
| 2,361,537 | Frank | Oct. 31, 1944 |
| 2,688,688 | Holtz | Sept. 7, 1954 |
| 2,977,566 | Neumann et al. | Mar. 28, 1961 |